(12) United States Patent
Hirose et al.

(10) Patent No.: US 7,412,292 B2
(45) Date of Patent: Aug. 12, 2008

(54) REMOTE CONTROL APPARATUS

(75) Inventors: Koji Hirose, Osaka (JP); Kazuhiro Miyahara, Osaka (JP); Hideaki Takechi, Osaka (JP); Toshiharu Koshino, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 292 days.

(21) Appl. No.: 10/578,156

(22) PCT Filed: Nov. 9, 2004

(86) PCT No.: PCT/JP2004/016593

§ 371 (c)(1),
(2), (4) Date: May 4, 2006

(87) PCT Pub. No.: WO2005/048116

PCT Pub. Date: May 26, 2005

(65) Prior Publication Data

US 2007/0088824 A1    Apr. 19, 2007

(30) Foreign Application Priority Data

Nov. 13, 2003  (JP) ............................. 2003-383532

(51) Int. Cl.
*G05B 19/18* (2006.01)
(52) U.S. Cl. ............................. 700/65; 700/9

(58) Field of Classification Search ..................... 700/9, 700/18, 23, 65, 83, 86, 169
See application file for complete search history.

(56) References Cited

U.S. PATENT DOCUMENTS

| 5,805,155 | A  | * | 9/1998 | Allibhoy et al. ............. 725/115 |
| 6,385,497 | B1 | * | 5/2002 | Ogushi et al. ............... 700/110 |
| 6,799,195 | B1 | * | 9/2004 | Thibault et al. ............. 709/203 |
| 7,006,881 | B1 | * | 2/2006 | Hoffberg et al. .............. 700/83 |
| 7,191,021 | B2 | * | 3/2007 | Prasad et al. .................. 700/83 |
| 2002/0055977 | A1 | * | 5/2002 | Nishi ........................ 709/208 |
| 2004/0181292 | A1 | * | 9/2004 | Ha et al. ...................... 700/17 |

FOREIGN PATENT DOCUMENTS

| EP | 1061701 A1 | 12/2000 |
| JP | 2000-209261 A | 7/2000 |
| JP | 2000242581 | 9/2000 |
| JP | 2001-67280 A | 3/2001 |
| JP | 2002-73434 A | 3/2002 |
| JP | 2002-223483 A | 8/2002 |

* cited by examiner

*Primary Examiner*—Thomas K Pham
(74) *Attorney, Agent, or Firm*—Harness, Dickey & Pierce, PLC

(57) ABSTRACT

The present invention provides a remote control apparatus comprising a controlled appliance and a server being connected via communication means, in which if data stored in the server is present, a notice command is promptly issued to the corresponding controlled appliance, and the controlled appliance having received the notice command automatically transmits a data acquisition request and receives the data stored in the server, whereby complicated operation by the user is not necessary and the capacity of the storage device of the server can be suppressed significantly.

13 Claims, 16 Drawing Sheets

Fig. 2

| APPLIANCE ID | STORAGE LOCATION | IMAGE DATA NAME | TYPE | ... |
|---|---|---|---|---|
| D1234 | holder_a | pic0001.jpg | 01 | ... |
| D2345 | holder_b | pic0002.jpg | 01 | ... |
| D5678 | holder_c | pic0003.jpg | 02 | ... |
| ... | ... | ... | ... | ... |

Fig.3

| APPLIANCE ID | APPLIANCE PW |
|---|---|
| D1234 | 34567 |
| D2345 | 45678 |
| D5678 | 56789 |
| ⋮ | ⋮ |

Fig.14

| DESTINATION | STORAGE LOCATION | DATA NAME | ... |
|---|---|---|---|
| Y1234 | holder_a | pic0001.txt | ... |
| Y2345 | holder_b | pic0002.txt | ... |
| Y5678 | holder_c | pic0003.txt | ... |
| ... | ... | ... | ... |

Fig.15

| USER ID | USER PW |
|---------|---------|
| Y1234 | abcd12 |
| Y2345 | cdef23 |
| Y5678 | efgh77 |
| ⋮ | ⋮ |

REMOTE CONTROL APPARATUS

TECHNICAL FIELD

The present invention relates to a remote control apparatus that controls, for example, household electronic appliances, more particularly, audio-visual appliances (AV appliances), via the Internet.

BACKGROUND ART

In recent years, electronic appliances being used in households, such as audio-visual appliances (AV appliances), have become capable of recording not only image data, audio data and text data but also various kinds of data, and products equipped with a large-capacity storage device, such as a hard disk, have been developed. Hence, it is considered that conventional AV appliances are used for new applications, for example, applications for acquiring and storing various kinds of data, such as image data created using other AV appliances, in addition to image recording and reproducing functions using a large-capacity storage device.

A conventional remote control apparatus that remote-controls an electronic appliance, such as an AV appliance, serving as a controlled appliance using a server will be described below. FIG. 13 is a block diagram showing the configuration of the conventional remote control apparatus. FIG. 14 shows an example of the data management table of the server in the conventional remote control apparatus, and FIG. 15 shows an example of the user management table of the server thereof. FIG. 16 is a flowchart showing data acquisition processing in the conventional remote control apparatus.

In FIG. 13, a controlled appliance 100 is an electronic appliance being used in a household, such as a personal computer (PC), a tuner, a television receiver or a DVD recorder. Data transmission and reception are carried out between the controlled appliance 100 and a server 150 being connected thereto via the Internet.

In the controlled appliance 100, a communication control part 101 has a function of carrying out communication with the server 150 via the Internet. The user creates various commands at an operation part 107. A user-information storage part 106 stores a user ID (user identification number) and a user PW (user password) unique to each user. A command processing part 102 transmits a command to the server as commanded from the operation part 107. A data receiving part 103 receives the data transmitted from the server 150 via the communication control part 101. A data storage control part 104 carries out control to record the data received by the data receiving part 103 in a recording medium. A data storage part 105 is a recording medium, such as a hard disk or a DVD, and stores various kinds of data.

On the other hand, in the server 150, a communication control part 151 has a function of carrying out communication with the controlled appliance 100 via the Internet. A user management part 155 manages information regarding respective users and judges whether the command from the controlled appliance 100 is correct or not. A data filing part 152 stores various kinds of data, for example, image data including still images and moving images, and audio data. A data management part 153 is usually referred to as a file system or the like and carries out the management of the data stored in the data filing part 152. A data transmission part 154 transmits the data stored in the data filing part 152 to the controlled appliance 100.

FIG. 14 shows an example of the data management table of the data management part 153 of the server 150 in the conventional remote control apparatus. In the data management table, at least a user ID ("destination" in FIG. 14) for identifying a user and data indicating the name and storage location of the data transmitted to the user ID or the data being stored. The table is configured so that the data corresponding to the user ID can be fetched from the data filing part 152 on the basis of the management table of the data management part 153 when the server 150 receives a data acquisition request from the controlled appliance 100.

FIG. 15 shows an example of the user management table of the user management part 155 of the server 150. The user management table stores table data according to which a judgment is made as to whether the data acquisition request from the controlled appliance 100 is issued from the correct user or not, and the table data comprises at least a user ID and a user PW as data. If a login processing request or a data acquisition request is issued from the controlled appliance 100, the user management part 155 judges, using the user management table, whether the user is the correct user or not by respectively comparing the user ID and the user PW in the command with those stored therein.

The data acquisition operation in the conventional remote control apparatus configured as described above will be explained by using the flowchart of FIG. 16.

Electronic mail is a typical example of data transmission and reception via the Internet. Usually, application software for transmitting and receiving electronic mail is installed in a personal computer serving as the controlled appliance 100. When the user transmits and receives electronic mail, he starts the application software for electronic mail in the personal computer. Next, the user operates the operation part 107 and creates a data acquisition request command, for example. Hence, the command processing part 102 reads the user ID and the user PW from the user-information storage part 106 and logs into the server 150. The login processing is used to confirm the user ID and the user PW in the user management part 155 of the server 150 to judge whether the communication has been done from the correct user or not. After the login processing is finished, the command processing part 102 transmits the data acquisition request to the server 150 as commanded from the operation part 107. The data acquisition request is transmitted to the data management part 153 via the user management part 155. The data management part 153 confirms whether the data corresponding to the user ID of the user who transmitted the data acquisition request is present or not in the data stored in the data filing part 152. If the corresponding data is not present, a status indicating that there is no stored data is returned to the corresponding controlled appliance 100. If the data corresponding to the user ID is present, the data is transmitted to the data communication part 154. The data communication part 154 transmits the received data to the data receiving part 103 of the corresponding controlled appliance 100 via the communication control parts 151 and 101. The data receiving part 103 transmits the received data to the data storage control part 104. The data storage control part 104 stores the data in the data storage part 105 while adding file management information or the like required dependent on the state of a recording medium in which the data is stored. After the data storage is finished, a status indicating that the data storage is finished is returned to the server 150. After the data storage is finished, the controlled appliance 100 confirms whether other data is stored in the data filing part 152 of the server 150. If other data is present, the data is stored according to the same procedure as that described above. The above-mentioned processing is repeated until the stored data that corresponds to the user ID and is stored in the data filing part 152 of the server 150 becomes extinct.

Patent document 1: Japanese Patent Application Laid-Open No. JP-A-2000-242581

DISCLOSURE OF THE INVENTION

Problem to be Solved by the Invention

In the conventional remote control apparatus, it is not automatically known whether data is received and stored in the server 150 or not; hence, it is necessary to create a data acquisition request using a complicated operation in the controlled appliance 100, such as a personal computer, each time the controlled appliance 100 acquires data from the server 150. In addition, when the user is not at his home or the like in which the controlled appliance 100 is located, there is a problem that he cannot acquire the data stored in the server 150.

Furthermore, data remains stored in the server 150 until a data acquisition request created by the operation on the operation part 107 by the user or a data acquisition request from application software is transmitted to the server 150; hence, in the server 150 of the conventional remote control apparatus, it is necessary to prepare a storage device having a considerably large capacity for each user. Therefore, the conventional remote control apparatus has problems of increasing the steps and cost for the operation of the server 150, for example.

For the purpose of solving the problems encountered in the conventional remote control apparatus, the present invention is intended to provide a remote control apparatus in which data, if stored in its server, is notified promptly to the corresponding controlled appliance, and the data stored in the server is automatically transmitted to the controlled appliance, whereby complicated operation by the user is not necessary and the capacity of the storage device of the server can be suppressed.

Means for Solving Problem

For the purpose of attaining the above-mentioned object, the present invention provides a remote control apparatus in which communication is carried out between a controlled appliance and a server via communication means, the controlled appliance comprising:

a communication control part that carries out communication, a notice receiving part that receives a notice command indicating that data has arrived at the server, an appliance unique data management part that manages appliance unique data being unique to each controlled appliance, a data acquisition request transmission part that transmits a data acquisition request to the server on the basis of the notice command received by the notice receiving part, a data receiving part that receives data from the server, a data storage control part that controls the data storage destination of the data received by the data receiving part, and a data storage part that stores the data transmitted from the data storage control part, and the server comprising:

a communication control part that carries out communication, a data filing part that saves and stores data, such as still images and moving images, a data management part that manages stored data, an appliance management part that stores appliance unique data for identifying the controlled appliance, a notification part that notifies the controlled appliance that data is present in the data filing part, and a data transmission part that receives an acquisition request command from the controlled appliance and transmits the data stored in the data filing part to the controlled appliance, wherein when data is stored in the data filing part of the server, a notice command indicating data acquisition is transmitted to the controlled appliance, the controlled appliance having received the notice command transmits an acquisition request to the server, and the data stored in the data filing part of the server is received and stored in the data storage part.

The remote control apparatus according to the present invention configured as described above is configured so that data, if stored in the server, is notified promptly to the corresponding controlled appliance, and the stored data can be automatically transmitted to the corresponding controlled appliance, whereby complicated operation by the user is not necessary and the capacity of the storage device of the server can be reduced.

Effect of the Invention

The remote control apparatus according to the present invention is configured so that data, if stored in the server, is notified promptly to the corresponding controlled appliance, and so that the stored data is automatically transmitted to the controlled appliance. The present invention can thus provide a remote control apparatus that eliminates the need for the user to perform complicated operation for data acquisition. Furthermore, the remote control apparatus according to the present invention can manage the data of numerous controlled appliances even if the capacity of the storage device of the server is small. Therefore, in the remote control apparatus according to the present invention, the man-hours and cost for the operation of the server can be reduced significantly.

In the conventional remote control apparatus, a method in which data storage is confirmed at regular time intervals by accessing the server from the controlled appliance, such as a personal computer, is available to eliminate user operation. However, in this method, access from each controlled appliance to the server always occurs many times, and there is a problem of increasing traffic through communication means. In the remote control apparatus according to the present invention, however, access for notifying data storage is gained from the server only when data is stored in the server; hence, the remote control apparatus has an effect capable of reducing unnecessary traffic through communication means.

BRIEF DESCRIPTION OF DRAWINGS

FIG. 2 is a view showing an example of the data management table of the data management part in the server thereof according to Embodiment 1;

FIG. 3 is a view showing an example of the appliance management table of the appliance management part in the server according to Embodiment 1;

FIG. 14 is the view showing an example of the data management table of the server in the conventional remote control apparatus;

FIG. 15 is the view showing an example of the user management table of the server shown in FIG. 14.

EXPLANATIONS OF NUMERALS

Figure 1:
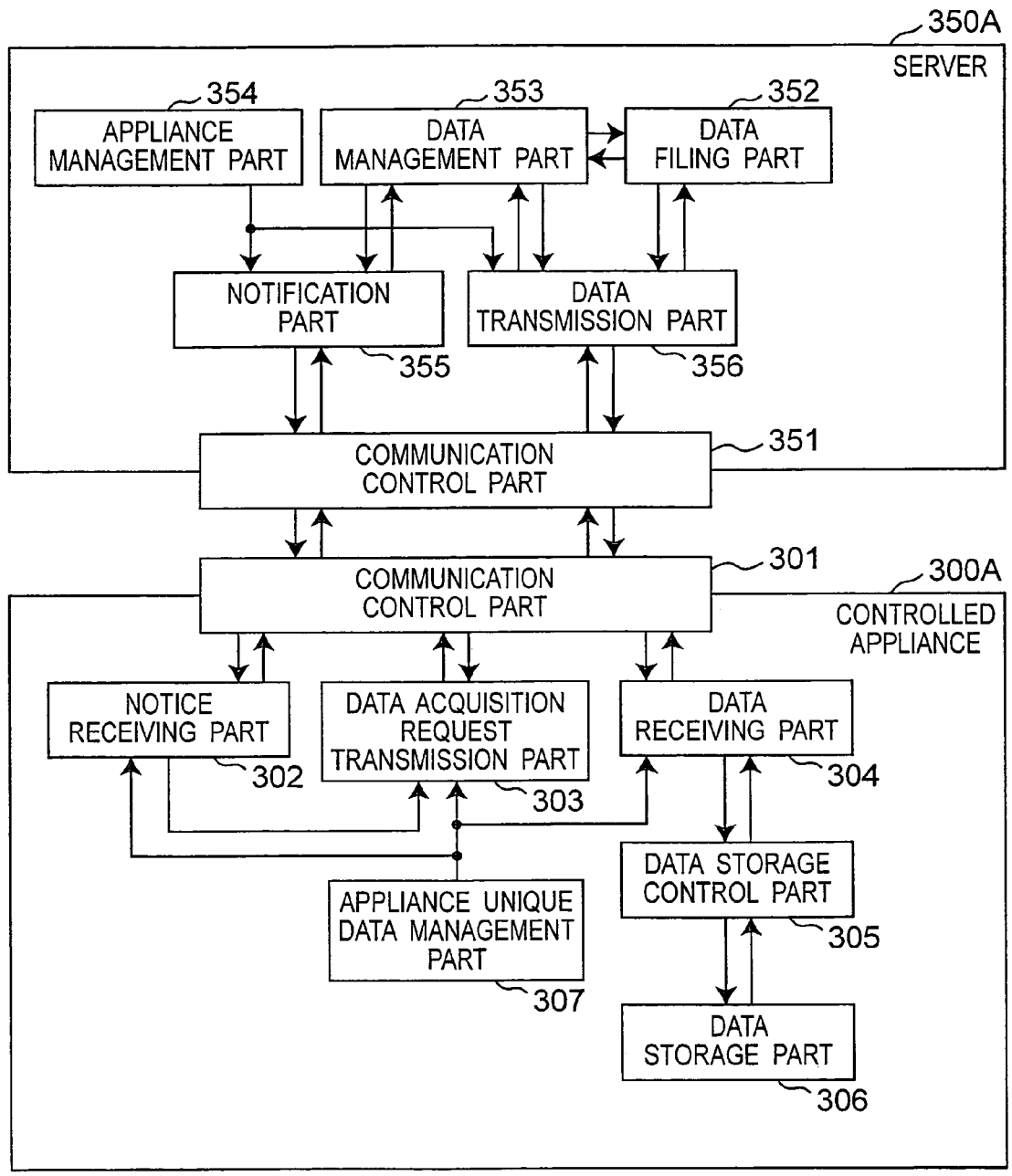
FIG. 1 is a block diagram showing the configuration of a remote control apparatus according to Embodiment 1 of the present invention.

100 controlled appliance
101 communication control part
102 command processing part
103 data receiving part
104 data storage control part
105 data storage part
106 user-information storage part
107 operation part
150 server
151 communication control part
152 data filing part
153 data management part
154 data transmission part
155 user management part
300 controlled appliance
301 communication control part
302 notice receiving part
303 data acquisition request transmission part
304 data receiving part
305 data storage control part
306 data storage part
307 appliance unique data management part
308 appliance unique data transmission part
309 appliance control part
310 appliance state judgment part
311 data display part
312 notice display part
313 operation part
350 server
351 communication control part
352 data filing part
353 data management part
354 appliance management part
355 notification part
356 data transmission part
357 appliance unique data receiving part
358 receiving part
359 analyzing part
360 inter-server communication part

BEST MODE FOR CARRYING OUT THE INVENTION

Preferable embodiments of a remote control apparatus according to the present invention will be described below referring to the accompanying drawings.

Embodiment 1

Figure 4:
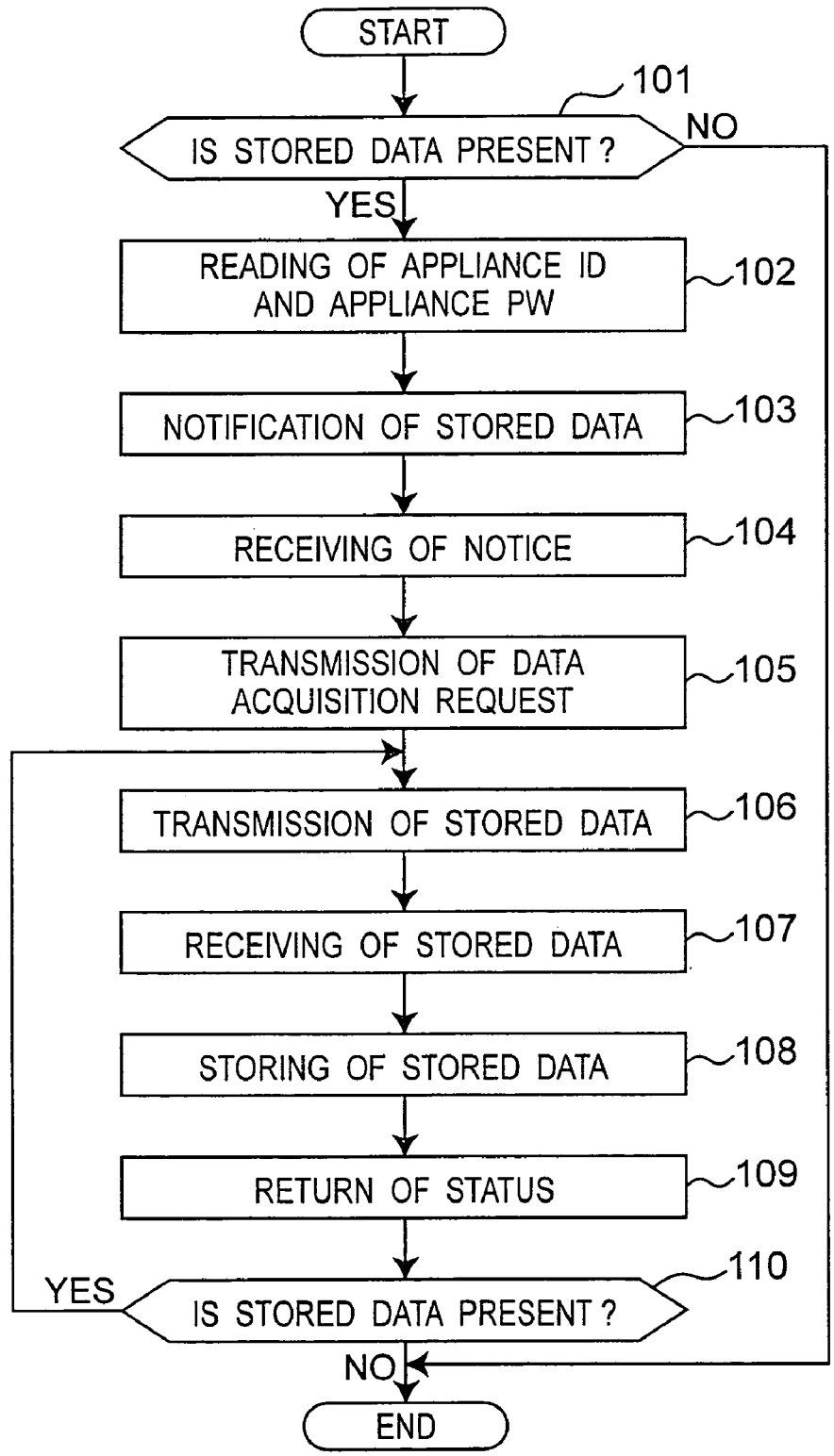
FIG. 4 is a flowchart showing data acquisition processing in the remote control apparatus according to Embodiment 1.

FIG. 1 is a block diagram showing the configuration of a remote control apparatus according to Embodiment 1 of the present invention. FIG. 2 shows an example of the data management table of the data management part in the server thereof, and FIG. 3 shows an example of the appliance management table of the appliance management part in the server. FIG. 4 is a flowchart showing data acquisition processing in the remote control apparatus according to Embodiment 1.

In FIG. 1, a controlled appliance 300A is an electronic appliance being used in a household, such as a personal computer (PC), a tuner, a television receiver or a DVD recorder. Data transmission and reception are carried out between the controlled appliance 300A and a server 350A being connected to the controlled appliance 300A via a communication means, such as the Internet. However, the communication means is not limited to the Internet.

In the controlled appliance 300A, a communication control part 301 has a function of carrying out communication with the server 350A via the Internet. A notice receiving part 302 receives a notice command indicating that data has been received by the server 350A. An appliance unique data management part 307 manages an appliance identification number (appliance ID) and an appliance password (appliance PW) respectively being unique to the controlled appliance 300A. A data acquisition request transmission part 303 transmits a data acquisition request to the server 350A on the basis of the notice command received by the notice receiving part 302. When the data acquisition request is transmitted, the data including the appliance ID and the appliance PW is read from the appliance unique data management part 307 so that the controlled appliance 300A can be identified, and the data is transmitted simultaneously. A data receiving part 304 receives the data transmitted from the server 350A via the communication control part 301. A data storage control part 305 carries out control to record the data received by the data receiving part 304 in a recording medium. A data storage part 306 is a recording medium, such as a hard disk or a DVD, and stores data transmitted from the server 350A.

In the server 350A, a communication control part 351 has a function of carrying out communication with the corresponding controlled appliance 300A via the Internet. An appliance management part 354 manages data being unique to each controlled appliance 300A, identifies the controlled appliance 300A and judges whether the command from the controlled appliance 300A is transmitted from the correct appliance or not. A data filing part 352 stores data including still images and moving images. A data management part 353 is usually referred to as a file system or the like and carries out the management of the data stored in the data filing part 352. A notification part 355 transmits a notice indicating the presence or absence of data stored in the data filing part 352 to the corresponding controlled appliance 300A. A data transmission part 356 has a function of transmitting the data stored in the data filing part 352 to each controlled appliance 300A via the communication control part 351.

FIG. 2 shows an example of the data management table stored in the data management part 353 of the server 350A in the remote control apparatus according to Embodiment 1. In the data management table, at least an appliance ID for identifying the controlled appliance 300A and data indicating the name and storage location of the data transmitted to the appliance ID or the data being stored. The table is configured so that the data corresponding to the appliance ID can be fetched from the data filing part 352 on the basis of the data management table of the data management part 353 when the server 350A receives a data acquisition request from the controlled appliance 300A.

FIG. 3 shows an example of the appliance management table stored in the appliance management part 354 of the server 350A. The appliance management table stores table data that is used to identify the controlled appliance 300A and according to which a judgment is made as to whether the command from the controlled appliance 300A is transmitted from the correct appliance or not, and the table data comprises at least an appliance ID and an appliance PW as data. When a notice is transmitted to the controlled appliance 300A or if a data acquisition request is issued from the controlled appliance 300A, a judgment is made using the appliance management table as to whether the controlled appliance is the correct controlled appliance 300A or not by respectively comparing the appliance ID and the appliance PW with those stored therein.

The data acquisition operation in the remote control apparatus according to Embodiment 1 configured as described above will be explained by using the flowchart of FIG. 4.

It is herein assumed that data to be transmitted to the controlled appliance 300A, including image data, audio data and text data, has been stored in the data filing part 352 of the server 350A. At this time, as the data stored in the data filing part 352 of the server 350A, data transmitted to the server 350A using electronic mail, data acquired from disk-shaped recording media, such as DVDs, data acquired from other servers via communication, etc. are stored.

In the server 350A, the data management part 353 confirms whether stored data is present in the data filing part 352 or not (at step 101). If the stored data is present, a notice indicating that data to be transmitted is present is transmitted to the notification part 355. The notification part 355 receives information, such as the appliance ID, storage location, image data name and type, from the appliance management table of the data management part 353, also receives necessary information regarding, for example, the relationship between the appliance ID and the appliance PW, from the appliance management table of the appliance management part 354, and identifies the controlled appliance 300A to which the stored data is transmitted (at step 102). Then, a notice indicating that the stored data is present is transmitted to the corresponding controlled appliance 300A via the Internet (at step 103).

In the notice receiving part 302 of the controlled appliance 300A, when the notice indicating that the stored data is present in the server 350A is transmitted, the fact that the stored data is stored in the server 350A is transmitted to the data acquisition request transmission part 303 (at step 104). The data acquisition request transmission part 303 reads the data regarding the appliance ID and the appliance PW from the appliance unique data management part 307 and transmits the data regarding the appliance ID and the appliance PW, together with a data acquisition request, to the server 350A (at step 105).

The data acquisition request received by the server 350A is transmitted to the data management part 353 via the notification part 355. To the data transmission part 356, the data management part 353 transmits the data corresponding to the appliance ID of the appliance from which the data acquisition request is transmitted, from among the data stored in the data filing part 352. The data transmission part 356 transmits the received data to the data receiving part 304 of the controlled appliance 300A via the Internet (at step 106).

In the controlled appliance 300A, the data receiving part 304 transmits the received data to the data storage control part 305 (at step 107). The data storage control part 305 adds file management information required dependent on the state of a recording medium for data storage to the received data, and stores the obtained data in the data storage part 306 (at step 108). When the data storage is finished, a status indicating that the data storage is finished is returned to the server 350A (at step 109).

When the data storage is finished, the server 350A confirms whether other data is stored in the data filing part 352 or not (at step 110). If other data is present, step 106 and the following steps are carried out in the same procedure as described above, and the data is stored. The above-mentioned processing is repeated until the stored data that corresponds to the appliance ID and is stored in the data filing part 352 of the server 350A becomes extinct.

As described above, in the remote control apparatus according to Embodiment 1, when data to be transmitted is stored in the server 350A, the presence of the stored data is notified promptly to the corresponding controlled appliance 300A, and the stored data is automatically transmitted to the corresponding controlled appliance 300A and stored therein. Hence, the user is not necessary to confirm with the server 350A that the data is stored, and the newest data is promptly transmitted to each controlled appliance and stored therein.

Embodiment 2

Figure 5:
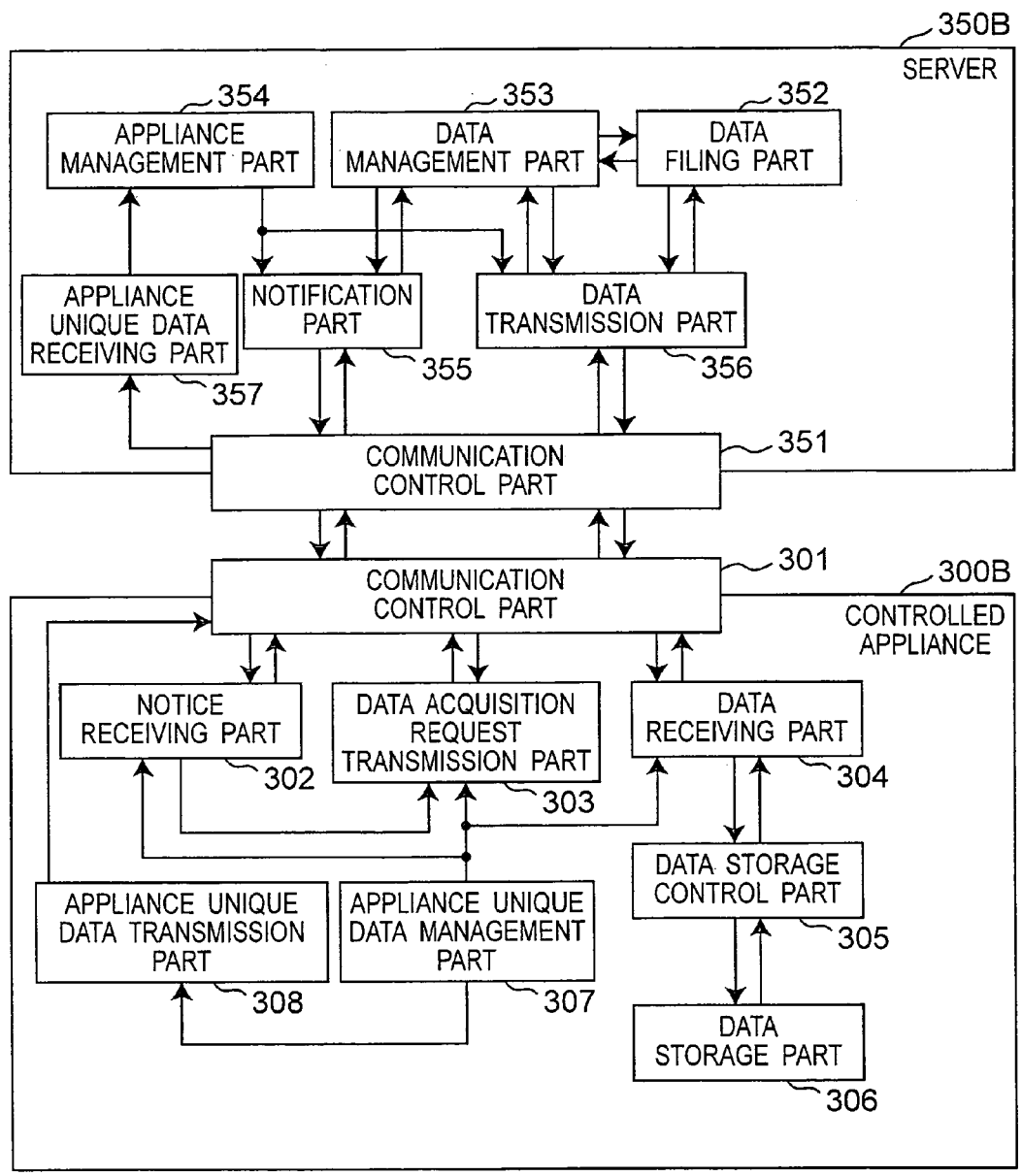
FIG. 5 is a block diagram showing the configuration of a remote control apparatus according to Embodiment 2 of the present invention.

A remote control apparatus according to Embodiment 2 of the present invention will be described below referring to FIG. 5. FIG. 5 is a block diagram showing the configuration of the remote control apparatus according to Embodiment 2 of the present invention.

In the remote control apparatus according to Embodiment 2 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 2 comprises a server 350B that is formed by providing the server 350A in the remote control apparatus according to Embodiment 1 with an appliance unique data receiving part 357, and a controlled appliance 300B that is formed by providing the controlled appliance 300A with an appliance unique data transmission part 308.

In the remote control apparatus according to Embodiment 2, the appliance unique data transmission part 308 of the controlled appliance 300B is configured so as to receive appliance unique data from the appliance unique data management part 307 and transmit the appliance unique data to the server 350B. Furthermore, the appliance unique data receiving part 357 of the server 350B notifies the appliance management part 354 about the appliance unique data from the appliance unique data transmission part 308.

In the remote control apparatus according to Embodiment 2 configured as described above, the controlled appliance 300B can notify the appliance management part 354 of the server 350B about the appliance unique data of the appliance unique data management part 307 from the appliance unique data transmission part 308.

Hence, in the remote control apparatus according to Embodiment 2, the appliance unique data regarding each controlled appliance 300B can be registered automatically from the controlled appliance 300B to the server 350B, and data maintenance at the appliance management part 354 of the server 350B is unnecessary. Therefore, the remote control apparatus according to Embodiment 2 is an easy-to-use system in which the management of the data regarding the controlled appliance 300B is performed easily.

Embodiment 3

Figure 6:
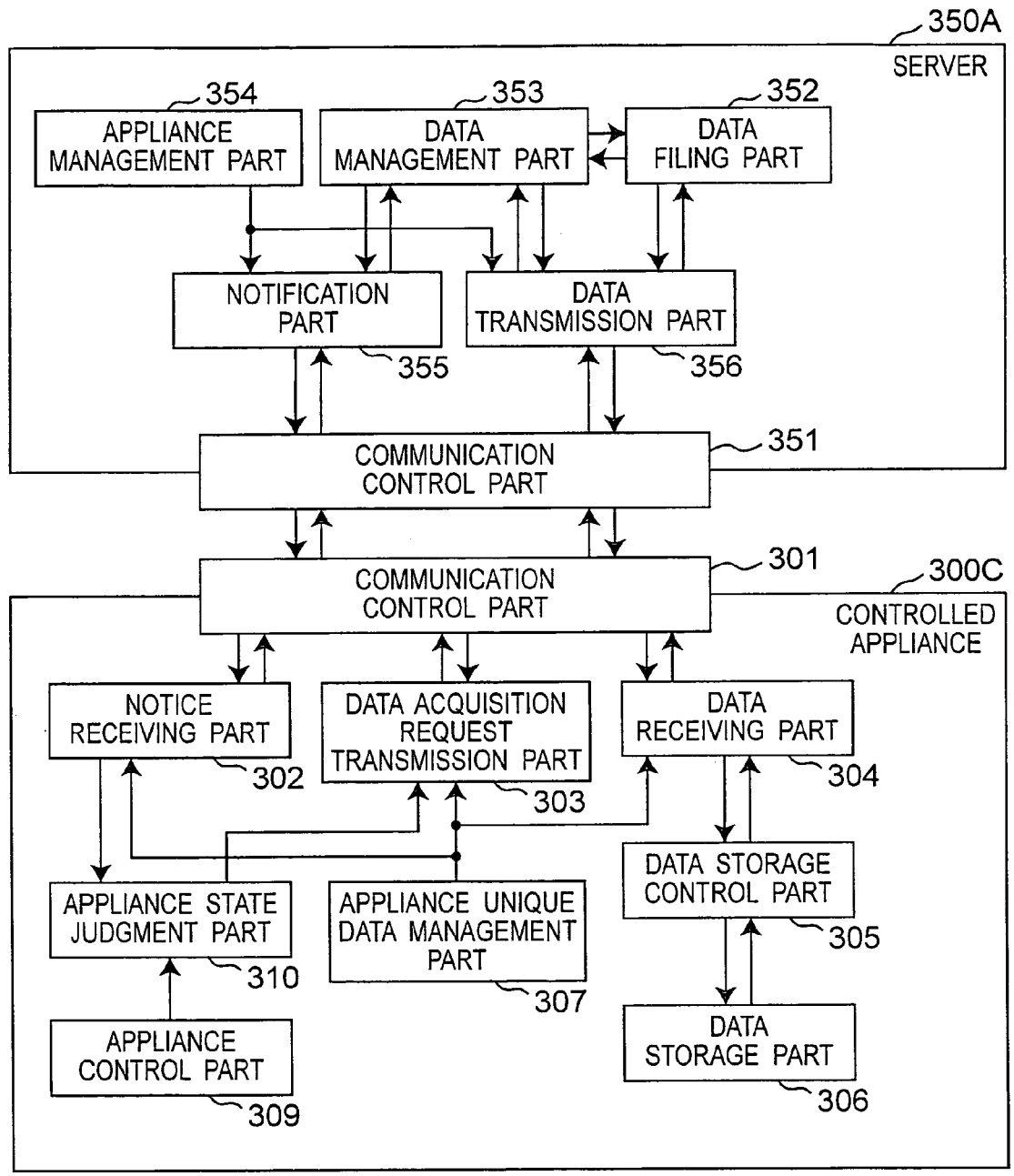
FIG. 6 is a block diagram showing the configuration of a remote control apparatus according to Embodiment 3 of the present invention.

A remote control apparatus according to Embodiment 3 of the present invention will be described below referring to FIG. 6. FIG. 6 is a block diagram showing the configuration of the remote control apparatus according to Embodiment 3 of the present invention.

In the remote control apparatus according to Embodiment 3 of the-present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 3 comprises a controlled appliance 300C that is formed by providing the controlled appliance 300A in the remote control apparatus according to Embodiment 1 with an appliance state judgment part 310 and an appliance control part 309, and the server 350A.

In the remote control apparatus according to Embodiment 3, the appliance control part 309 provided in the controlled appliance 300C has a function of controlling the controlled appliance 300C itself and is configured so as to output a signal indicating the control state of the controlled appliance 300C itself to the appliance state judgment part 310. The appliance state judgment part 310 has functions of receiving the signal from the appliance control part 309 and judging whether the controlled appliance 300C is in a state of being able to acquire data or not.

In the remote control apparatus according to Embodiment 3 configured as described above, when the notice receiving part 302 receives a notice command indicating that the server 350A has stored data, the appliance state judgment part 310 judges whether the controlled appliance 300C is in a state of being able to acquire data or not. When the appliance state judgment part 310 detects that the controlled appliance 300C is in the state of being able to acquire data, a data acquisition request is transmitted from the data acquisition request transmission part 303 to the server 350A via the Internet.

In the remote control apparatus, when the notice command is received, the controlled appliance 300C is not always in the state of being able to receive data from the server 350A. For example, in the case that the controlled appliance 300C is carrying out programmed recording, dubbing or editing, the controlled appliance 300C is not in the state of being able to receive data. In such a case, the transmission time of the data acquisition request is changed dependent on the operation state of the controlled appliance 300C, and data is received from the server 350C immediately after the controlled appliance 300C has become the timing of being able to receive data. Hence, the remote control apparatus according to Embodiment 3 can carry out data acquisition at an appropriate time dependent on the operation state of the controlled appliance 300C. Therefore, the user can drive the controlled appliance 300C regardless of the presence or absence of the data stored in the server 350A.

Embodiment 4

A remote control apparatus according to Embodiment 4 of the present invention will be described below. Because the remote control apparatus according to Embodiment 4 of the present invention has the same configuration as that of the remote control apparatus according to Embodiment 1 described above and shown in FIG. 1, the remote control apparatus will be described referring to FIG. 1.

The remote control apparatus according to Embodiment 4 of the present invention is configured so that the data filing part 352 of the server 350A can store not only image data and audio data but also text data, such as character information, and metadata. The remote control apparatus according to Embodiment 4 configured as described above is configured so that such various kinds of data are transmitted from the server 350A to the controlled appliance 300A via the Internet and stored in the data storage part 306. In the remote control apparatus configured as described above, even if any kinds of data are stored in the server 350A, they can be stored certainly in the controlled appliance 300A. As a result, the remote control apparatus according to Embodiment 4 is a system having excellent versatility.

Embodiment 5

Figure 7:
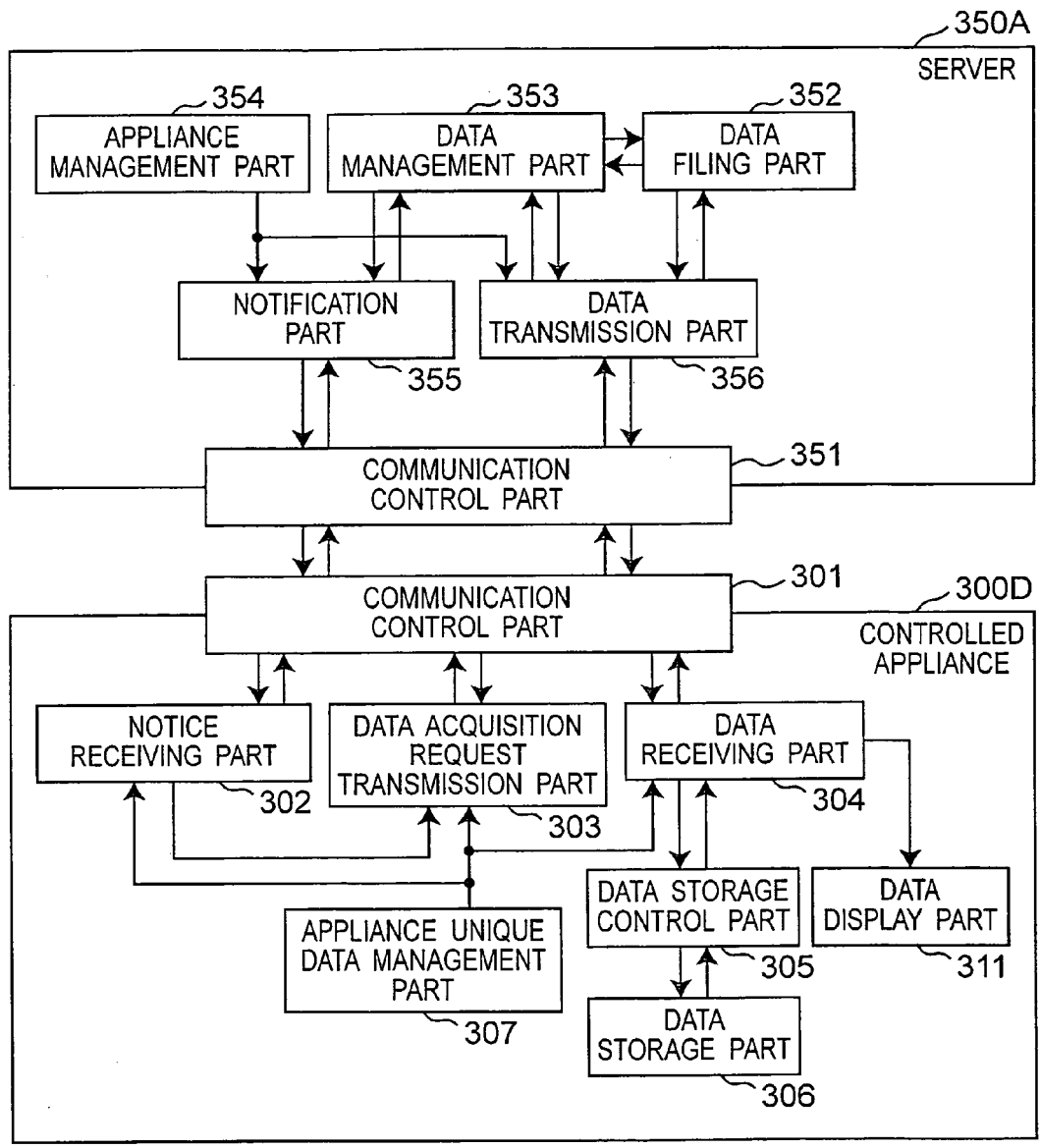
FIG. 7 is a block diagram showing the configuration of a remote control apparatus according to Embodiment 5 of the present invention.

A remote control apparatus according to Embodiment 5 of the present invention will be described below referring to FIG. 7. FIG. 7 is a block diagram showing the configuration of the remote control apparatus according to Embodiment 5 of the present invention.

In the remote control apparatus according to Embodiment 5 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 5 comprises a controlled appliance 300D that is formed by providing the controlled appliance 300A in the remote control apparatus according to Embodiment 1 with a data display part 311, and the server 350A.

In the remote control apparatus according to Embodiment 5, the controlled appliance 300D is equipped with the data display part 311 that receives data from the data receiving part 304 and displays the data. The remote control apparatus according to Embodiment 5 is configured so that image data or the like received from the server 350A can be displayed on the data display part 311. Hence, the user can easily recognize that image data or the like has been obtained and can understand the contents thereof.

Embodiment 6

A remote control apparatus according to Embodiment 6 of the present invention will be described below. Because the remote control apparatus according to Embodiment 6 of the present invention has the same configuration as that of the remote control apparatus according to Embodiment 1 described above and shown in FIG. 1, the remote control apparatus will be described referring to FIG. 1.

In the remote control apparatus according to Embodiment 6 of the present invention, image data and text data being used as a pair are stored as set data in the data filing part 352 of the server 350A. In the controlled appliance 300A, the data receiving part 304 receives all the image data and text data being used as a pair, and then the data storage part 306 stores the pair of data as set data. By virtue of storing the data as set data, image data and the descriptive text thereof (text data) being used as a pair, such as a news article, are processed collectively, whereby the remote control apparatus according to Embodiment 6 is a system that is easy to use for the user.

In Embodiment 6 described above, the configuration in which two types of data being used as a pair can be processed collectively is described; however, it may be possible to have a configuration in which three or more types of data are used as set data and processed collectively.

Various methods are available as methods for storing data in which image data and text data are used as a pair.

As an example, a method is available in which image data and text data are stored in the same storage location. In this case, when image data "pic0001.jpg" and text data (an example of file name: text0001.txt) are set so as to be used as a pair in the data management table of FIG. 2, the text data "text0001.txt" is also stored in the storage location "holder_a" in which the image data "pic0001.jpg" is stored. When the data stored as described above is read, the text data can also be read together with the image data by reading the data as set data at each storage location. Hence, as a method for distinguishing data being used as a pair, distinguishing can be done by confirming the presence or absence of text data at each storage location.

Furthermore, as another example, a method is available in which a management file describing the relationship between image data and text data is created separately. For example, in the data management table of FIG. 2, in the case that image data "pic0001.jpg" and text data (an example: text0001.txt) are set so as to be used as a pair, a management file (an example of file name: manage0001.txt) describing that "pic0001.jpg" and "text0001.txt" are used as a pair is created. At the time of data reading, the description in this management file is analyzed first, and the relationship between the image data and the text data is found; if the text data being used with the image data as a pair is present, the text data can also be read together with the image data. Hence, as a method for distinguishing data being used as a pair, distinguishing can be done by analyzing the management file. It is considered that such a management file is created for each appliance ID in the text file format as an example, although the management file may be stored in any format and in any location.

Embodiment 7

A remote control apparatus according to Embodiment 7 of the present invention will be described below. Because the remote control apparatus according to Embodiment 7 of the present invention has the same configuration as that of the remote control apparatus according to Embodiment 5 described above and shown in FIG. 7, the remote control apparatus will be described referring to FIG. 7.

In the remote control apparatus according to Embodiment 7 of the present invention, the controlled appliance 300D is equipped with the data display part 311 that receives data from the data receiving part 304 and displays the data as shown in FIG. 7. In addition, in the remote control apparatus according to Embodiment 7, image data and text data being used as a pair are stored as set data in the data filing part 352. After receiving all the image data and the text data being used as a pair at the data receiving part 304, the controlled appliance 300D stores the pair of data as set data in the data storage part 306. Furthermore, the controlled appliance is configured so that the data display part 311 can display the pair of data as set data.

In Embodiment 7 described above, the configuration in which two types of data being used as a pair can be processed collectively is described; however, it may be possible to have a configuration in which three or more types of data are used as set data and processed collectively.

In the remote control apparatus according to Embodiment 7, as a method for distinguishing data being used as a pair, the method described in Embodiment 7 described above is used.

Embodiment 8

Figure 8:
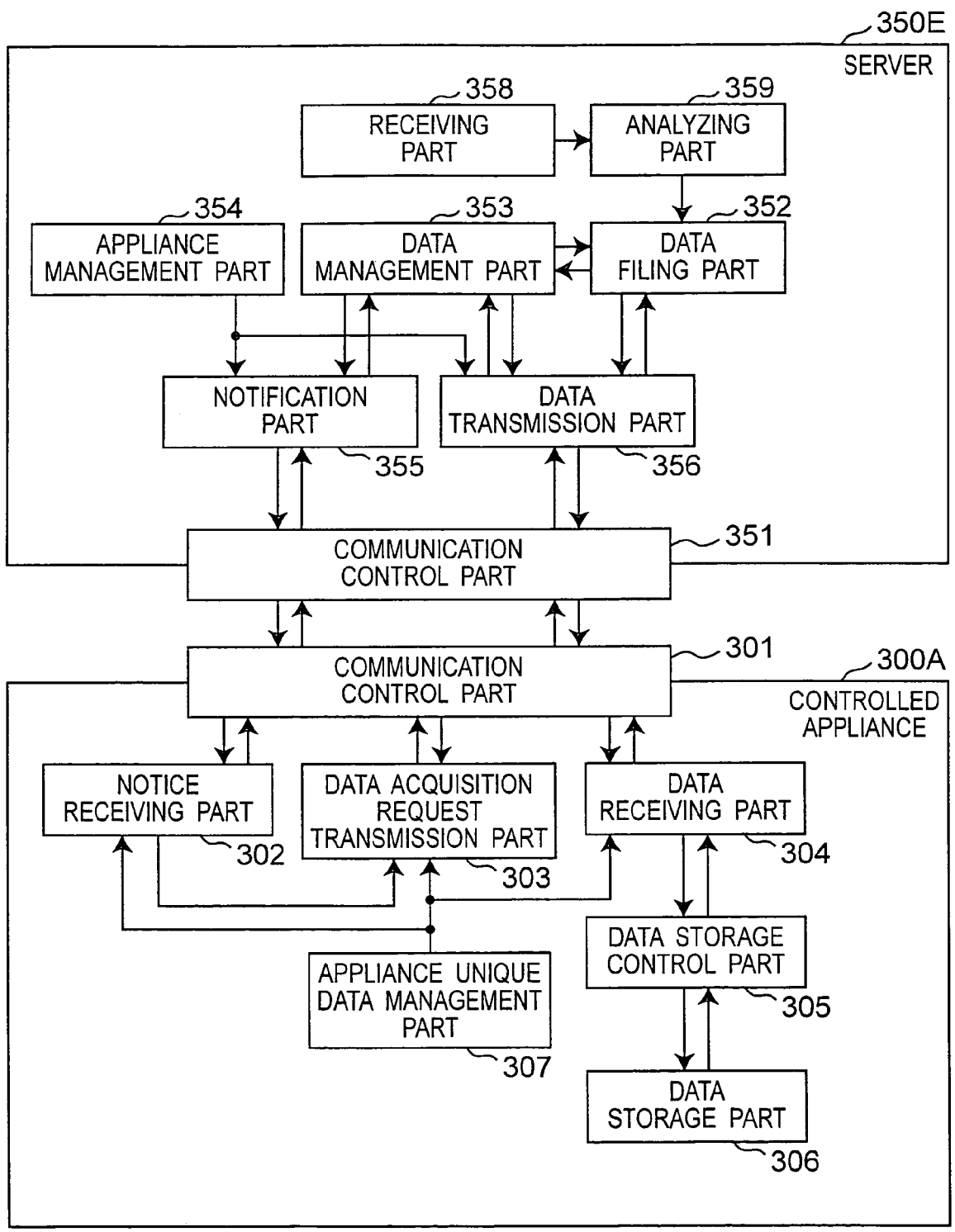
FIG. 8 is a block diagram showing the configuration of a remote control apparatus according to Embodiment 8 of the present invention.

A remote control apparatus according to Embodiment 8 of the present invention will be described below referring to FIG. 8. FIG. 8 is a block diagram showing the configuration of the remote control apparatus according to Embodiment 8 of the present invention.

In the remote control apparatus according to Embodiment 8 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 8 comprises a server 350E that is formed by providing the server 350A in the remote control apparatus according to Embodiment 1 with a receiving part 358 and an analyzing part 359, and the controlled appliance 300A.

The remote control apparatus according to Embodiment 8 is provided with the receiving part 358 that receives electronic mail to which images are attached and the analyzing part 359 that analyzes the received electronic mail, as means for storing data in the data filing part 352 of the server 350E. In the remote control apparatus according to Embodiment 8 configured as described above, at the server 350E, image data and text data transmitted in the form of electronic mail from various electronic appliances can be sorted and stored in a format transmittable to the controlled appliance 300A. Hence, the acquisition range of data to be transmitted from the server 350E to the controlled appliance 300A can be widened. As a result, it is less necessary to limit the acquisition format, and the remote control apparatus according to Embodiment 8 is a system that is easy to use.

A method described below is available as an example of the electronic mail analyzing method in the analyzing part 359.

Electronic mail transmitted in packets as digital data is received by the receiving part 358 and is decoded into text data (mail body) and attached file data. The analyzing part 359 judges whether a file (for example, image data) is attached to the received electronic mail or not. The judgment is made on the basis of the presence or absence of a file other than the text data, or in the case that information regarding the presence or absence of an attached file is described in the header information of the electronic mail, the judgment may be made according to the header information. If the analyzing part 359 judges that a file is attached to the electronic mail, the attached file is divided into text data and image data and stored in the data filing part 352.

Embodiment 9

Figure 9:
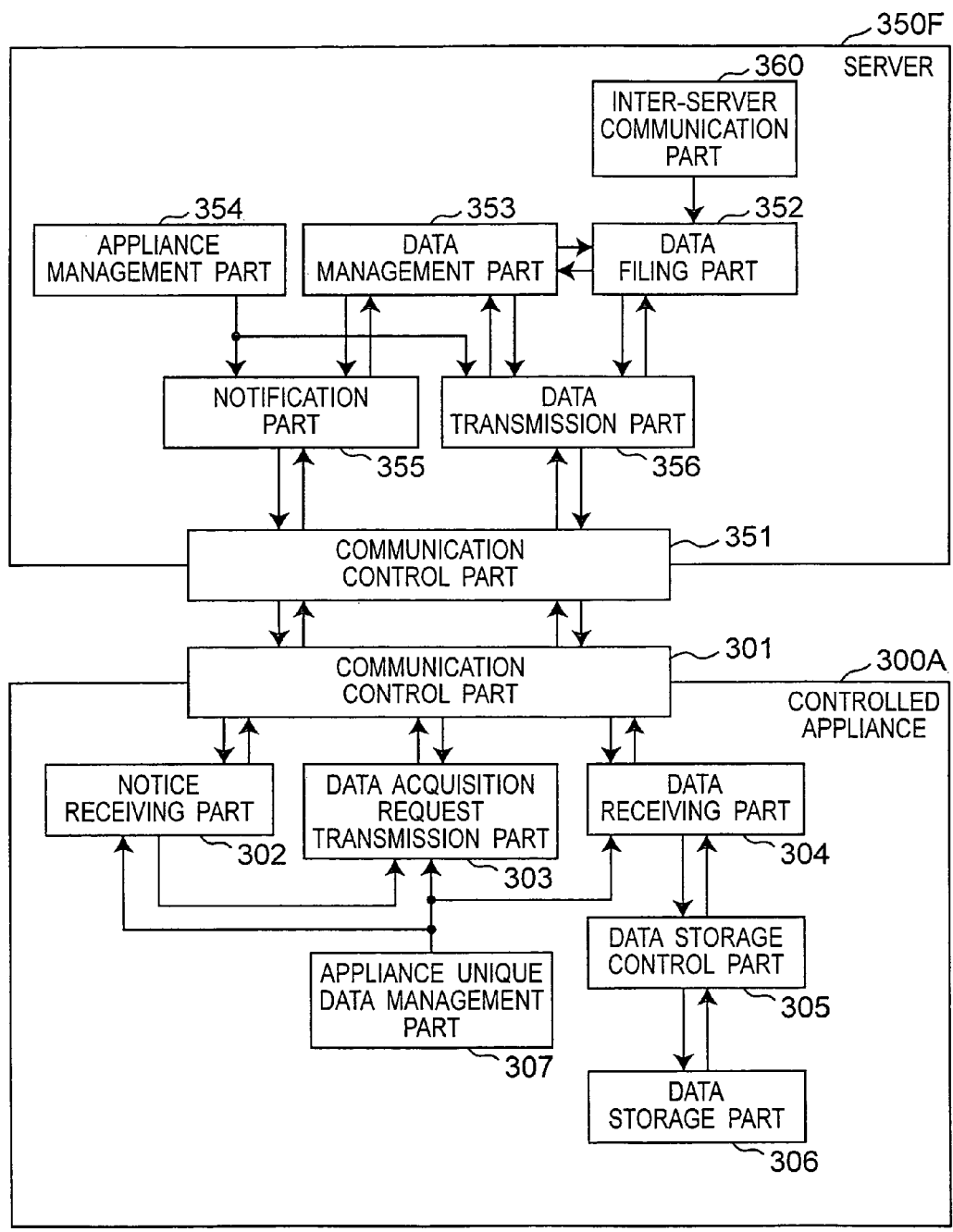
FIG. 9 is a block diagram showing the configuration of a remote control apparatus according to Embodiment 9 of the present invention.

A remote control apparatus according to Embodiment 9 of the present invention will be described below referring to FIG. 9. FIG. 9 is a block diagram showing the configuration of the remote control apparatus according to Embodiment 9 of the present invention.

In the remote control apparatus according to Embodiment 9 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 9 comprises a server 350F that is formed by providing the server 350A in the remote control apparatus according to Embodiment 1 with an inter-server communication part 360, and the controlled appliance 300A.

The remote control apparatus according to Embodiment 9 is provided with the inter-server communication part 360 operating as a means for communicating with other servers (not shown) and serving as a means for storing data to the data filing part 352 of the server 350F. In the remote control apparatus according to Embodiment 9 configured as described above, the acquisition source range of data to be transmitted to the controlled appliance 300A can be widened. As a result, the remote control apparatus according to Embodiment 9 can acquire various kinds of information and can establish an easy-to-use system.

Embodiment 10

Figure 10:
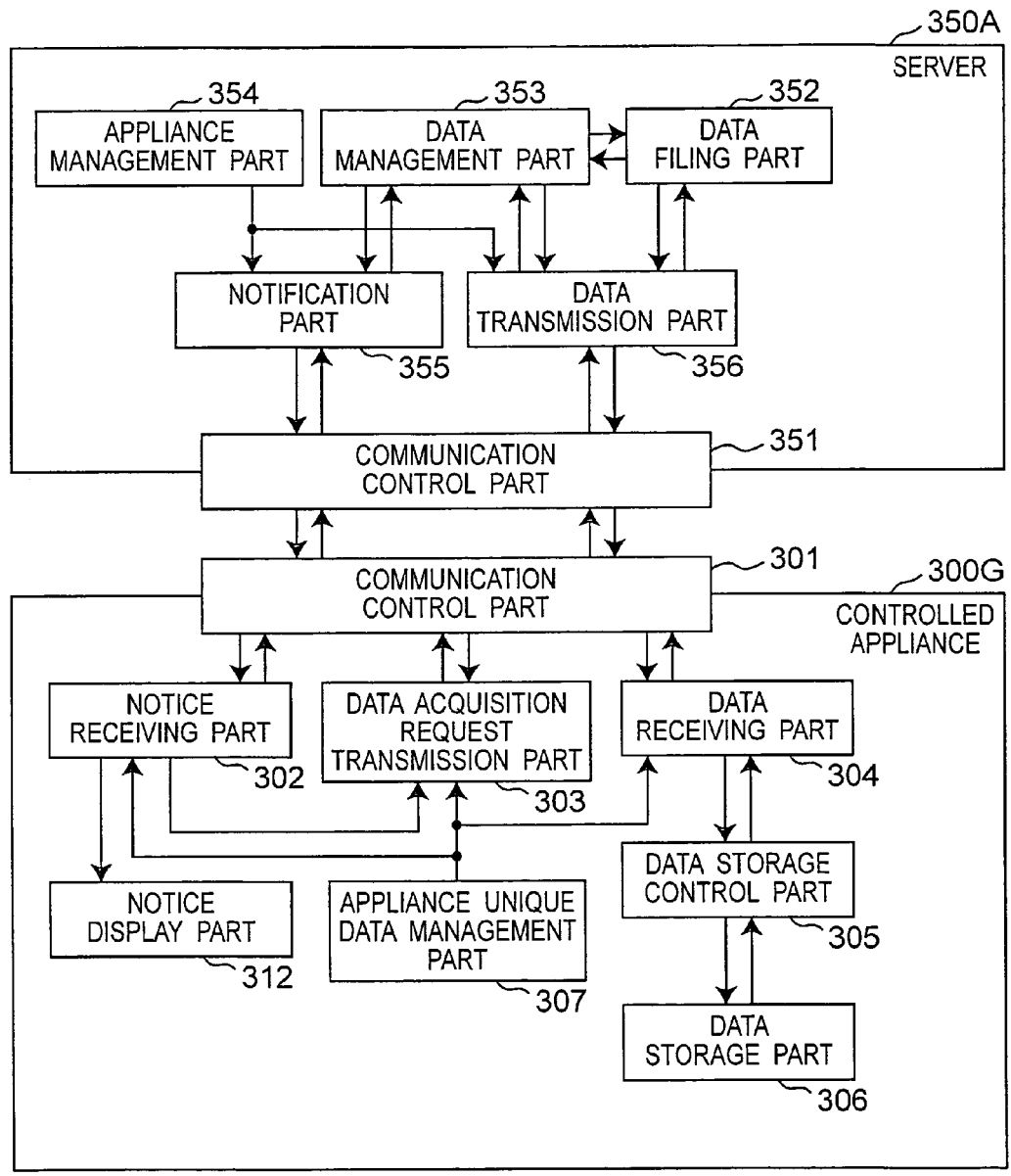
FIG. 10 is a block diagram showing the configuration of a remote control apparatus according to Embodiment 10 of the present invention.

A remote control apparatus according to Embodiment 10 of the present invention will be described below referring to FIG. 10. FIG. 10 is a block diagram showing the configuration of the remote control apparatus according to Embodiment 10 of the present invention.

In the remote control apparatus according to Embodiment 10 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 10 comprises a controlled appliance 300G that is formed by providing the controlled appliance 300A in the remote control apparatus according to Embodiment 1 with a notice display part 312, and the server 350A.

The remote control apparatus according to Embodiment 10 is equipped with the notice display part 312 that carries out display showing that a notice indicating that image data is stored in the server 350A is received when the notice receiving part 302 of the controlled appliance 300G has received the notice. Because the remote control apparatus according to Embodiment 10 configured as described above allows the user to be able to immediately know the arrival of the image data, the apparatus is a system that is easier to use.

Embodiment 11

Figure 11:
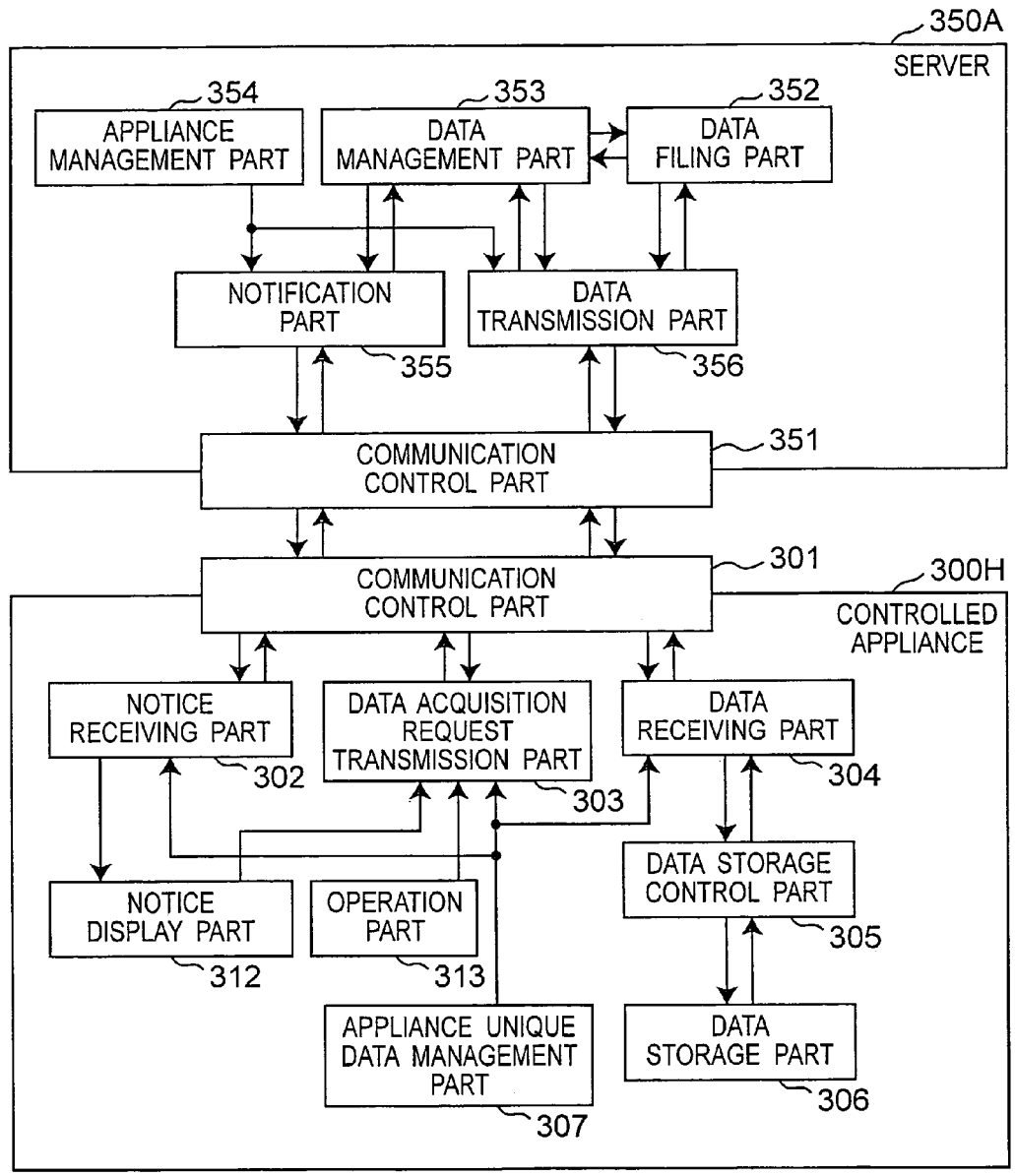
FIG. 11 is a block diagram showing the configuration of a remote control apparatus according to Embodiment 11 of the present invention.

A remote control apparatus according to Embodiment 11 of the present invention will be described below referring to FIG. 11. FIG. 11 is a block diagram showing the configuration of the remote control apparatus according to Embodiment 11 of the present invention.

In the remote control apparatus according to Embodiment 11 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 11 comprises a controlled appliance 300H that is formed by providing the controlled appliance 300A in the remote control apparatus according to Embodiment 1 with the notice display part 312 and an operation part 313, and the server 350A.

As in the case of Embodiment 10 described above, the remote control apparatus according to Embodiment 11 is provided with the notice display part 312 that carries out display showing that a notice indicating that image data is stored in the server 350A is received when the notice receiving part 302 of the controlled appliance 300G has received the notice. In addition, the remote control apparatus according to Embodiment 11 is equipped with the operation part 313 that creates an image data receiving command and is also equipped with the data acquisition request transmission part 303 that transmits an image data acquisition request on the basis of the receiving command created using the operation part 313. In the remote control apparatus according to Embodiment 11, in the case that the display is carried out on the notice display part 312, only when the user creates the receiving command, the image data acquisition request is transmitted to the server 350A. Hence, after knowing that the image data has arrived at the server 350A, the user can transmit the image data acquisition request at any desired timing.

Embodiment 12

A remote control apparatus according to Embodiment 12 of the present invention will be described below. Because the remote control apparatus according to Embodiment 12 of the present invention has the same configuration as that of the remote control apparatus according to Embodiment 1 described above and shown in FIG. 1, the remote control apparatus will be described referring to FIG. 1.

In the remote control apparatus according to Embodiment 12 of the present invention, the data storage control part 305 of the controlled appliance 300A shown in FIG. 1 has a function of sorting and storing data in a different folder or a different recording medium depending on the type of received image data. Hence, as in the example of the data management table shown in FIG. 2, an item "type" indicating the type of data is included, and the folder or recording medium to which data is stored is changed depending on the type of data. As a result, in the remote control apparatus according to Embodiment 12, the data received by the controlled appliance 300A is sorted and stored in the data storage part 306 automatically. The remote control apparatus according to Embodiment 12 further simplifies user's search operation, thereby being a system that is easier to use.

Embodiment 13

Figure 12:
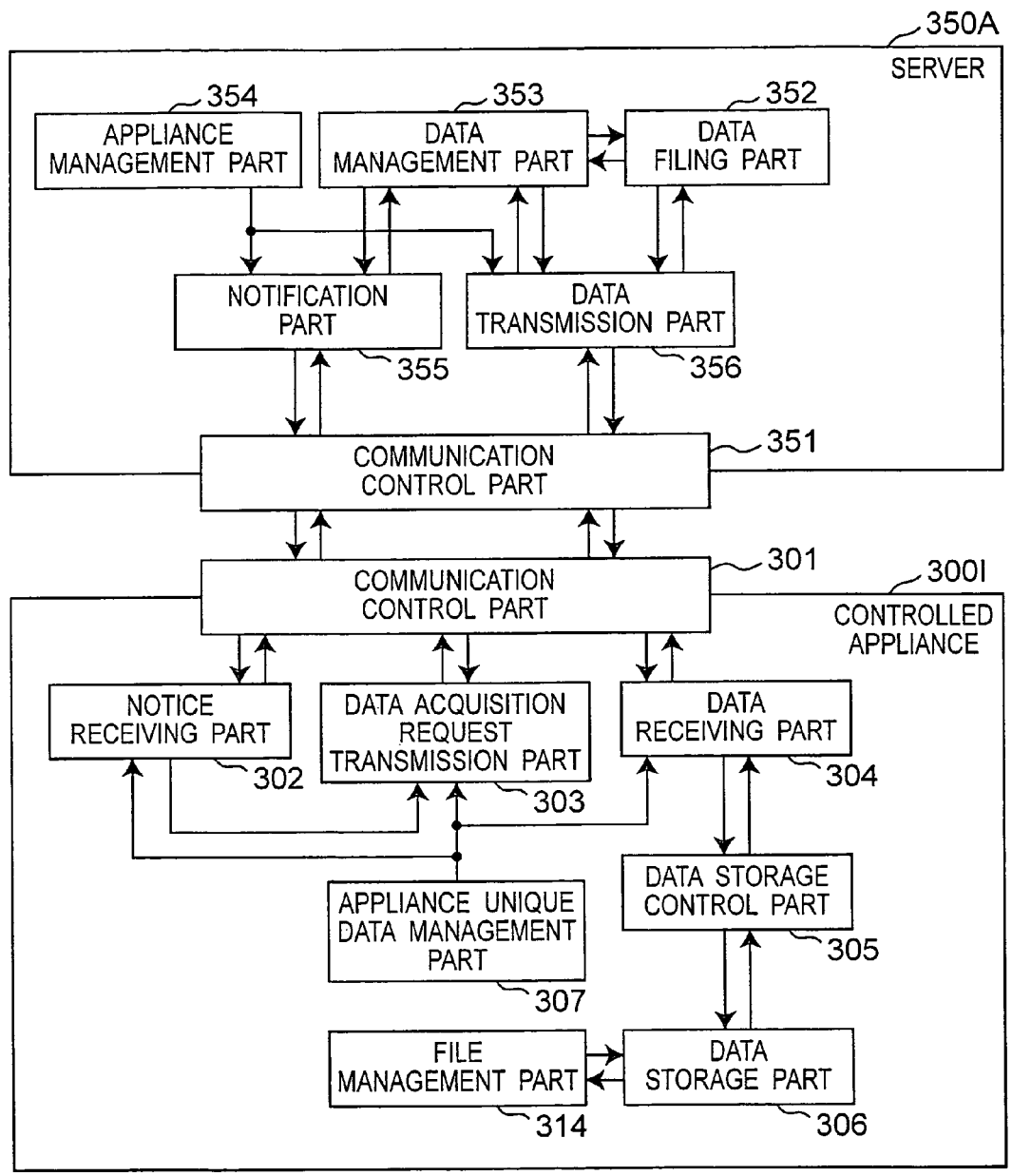
FIG. 12 is a block diagram showing the configuration of a remote control apparatus according to Embodiment 13 of the present invention.
Figure 13:
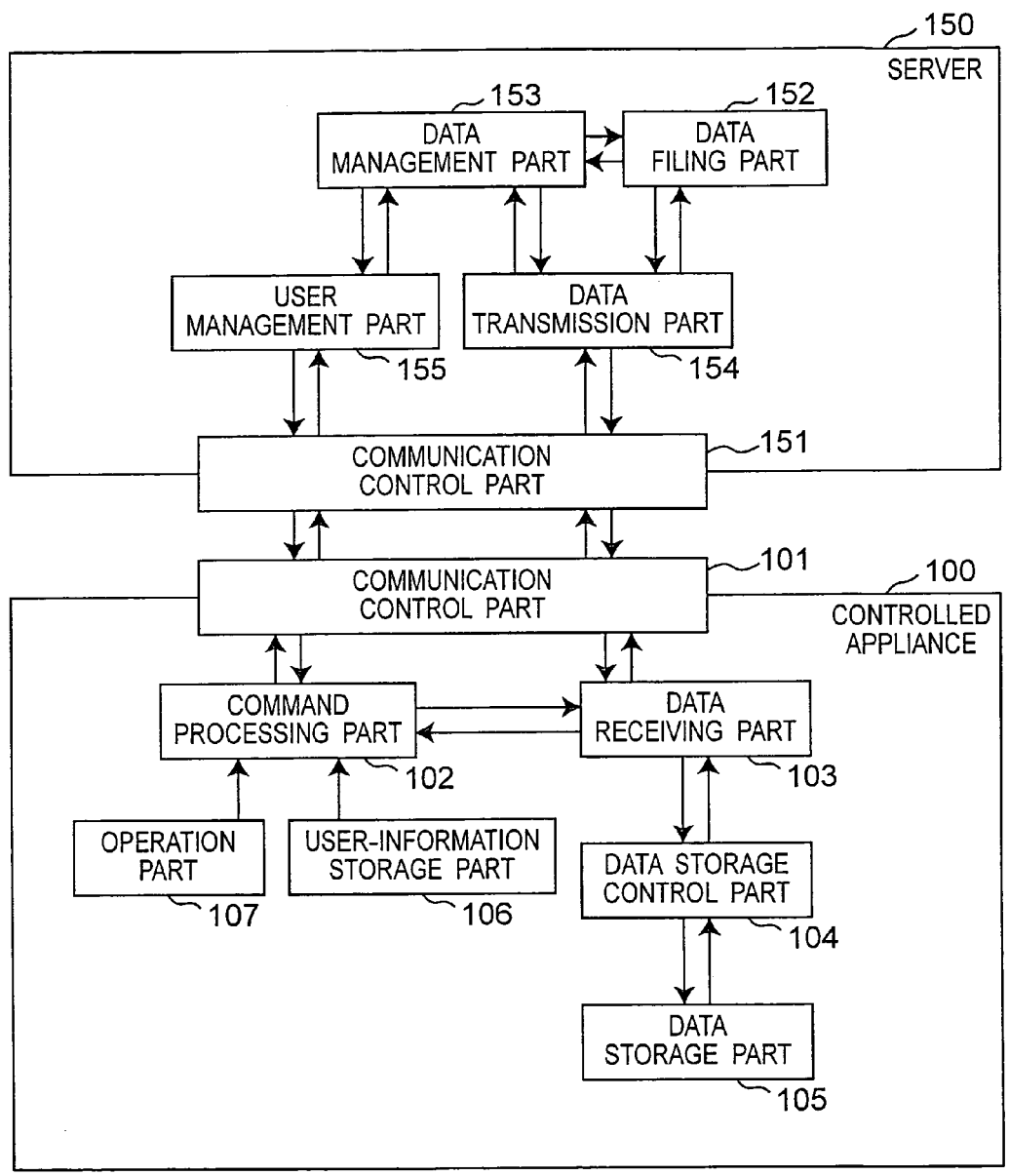
FIG. 13 is the block diagram showing the configuration of the conventional remote control apparatus.
Figure 16:
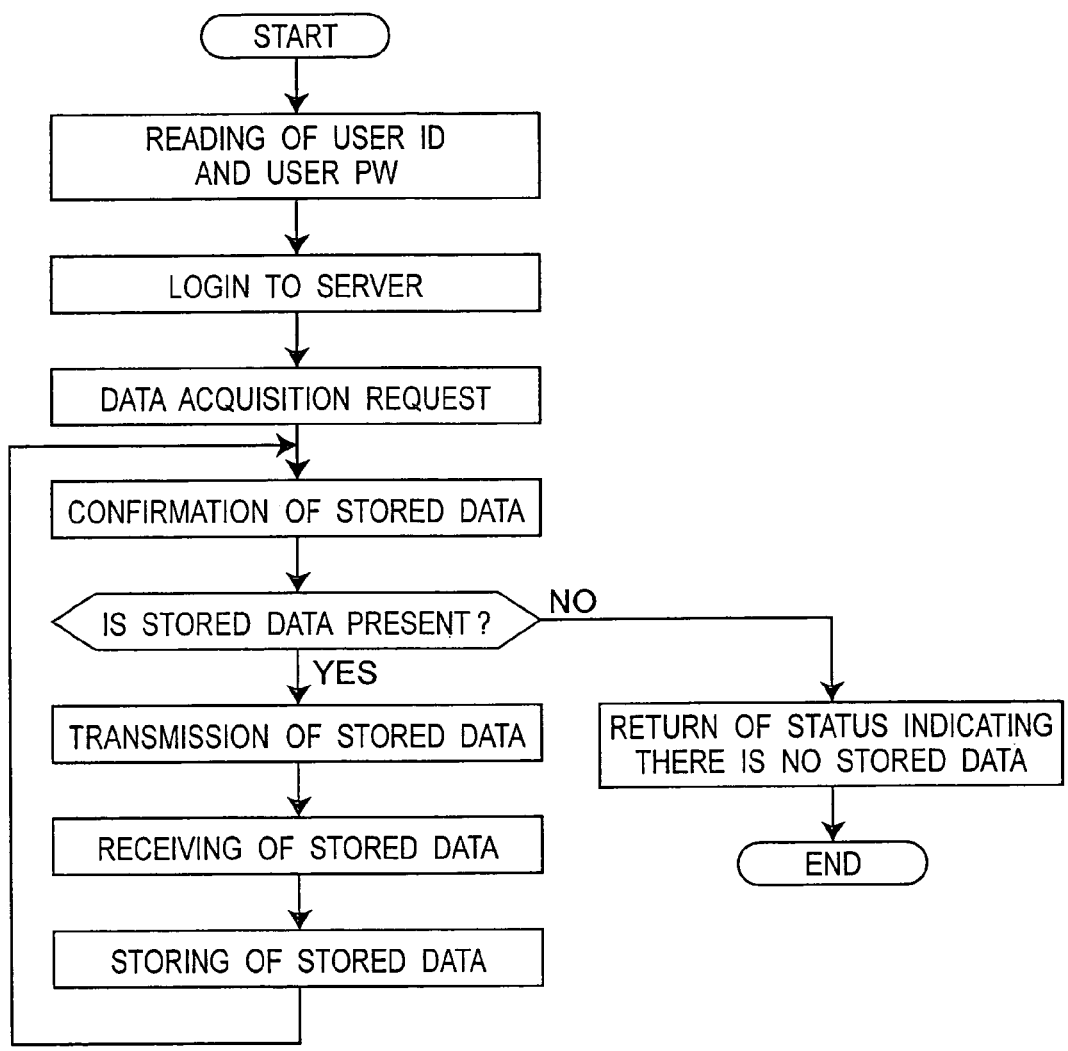
FIG. 16 is the flowchart showing data acquisition processing in the conventional remote control apparatus.

A remote control apparatus according to Embodiment 13 of the present invention will be described below referring to FIG. 12. FIG. 12 is a block diagram showing the configuration of the remote control apparatus according to Embodiment 13 of the present invention.

In the remote control apparatus according to Embodiment 13 of the present invention, the components having the same functions and configurations as those used in the remote control apparatus according to Embodiment 1 described above are designated by the same numerals, and the descriptions in Embodiment 1 are applied to their descriptions. The remote control apparatus according to Embodiment 13 comprises a controlled appliance 300I that is formed by providing the controlled appliance 300A in the remote control apparatus according to Embodiment 1 with a file management part 314, and the server 350A.

In the remote control apparatus according to Embodiment 13, in the case that the file management part 314 moves or erases set data comprising image data and text data stored as a pair in the data storage part 306, the image data and text data used as a pair are moved or erased simultaneously. The above-mentioned data processing in the remote control apparatus according to Embodiment 13 prevents only one type of the data constituting the pair from being left or not erased, and eliminates the need for the user to specially manage the two types of data as a pair of data.

In Embodiment 13 described above, the configuration in which two types of data being used as a pair can be processed collectively is described; however, it may be possible to have a configuration in which three or more types of data are used as set data and processed collectively.

In each of the above-mentioned embodiments according to the present invention, a configuration having one server is described; however, a configuration having multiple servers may also be used for operational reasons or the like.

INDUSTRIAL APPLICABILITY

In the present invention, when data is stored in the server connected via a communication means, the data storage is notified to the corresponding controlled appliance, and the data stored in the server is transmitted automatically in response to a data acquisition request from the-controlled appliance, whereby the present invention is useful in the field of remote control apparatus.

The invention claimed is:

1. A remote control apparatus comprising a controlled appliance and a server being connected via communication means, said controlled appliance comprising:
   a communication control part that carries out communication,
   a notice receiving part that receives a notice command indicating that data has arrived at said server,
   an appliance unique data management part that manages appliance unique data being unique to each controlled appliance,
   a data acquisition request transmission part that transmits a data acquisition request to said server on the basis of the notice command received by said notice receiving part,
   a data receiving part that receives data from said server,
   a data storage control part that controls the data storage destination of the data received by said data receiving part, and
   a data storage part that stores the data transmitted from said data storage control part, and said server comprising:
   a communication control part that carries out communication,
   a data filing part that saves and stores data,
   a data management part that manages stored data,
   an appliance management part that stores appliance unique data for identifying said controlled appliance,
   a notification part that notifies said controlled appliance that data is present in said data filing part, and
   a data transmission part that receives an acquisition request command from said controlled appliance and transmits the data stored in said data filing part to said controlled appliance, wherein
   when data is stored in the data filing part of said server, a notice command indicating data acquisition is transmitted to said controlled appliance, the controlled appliance having received the notice command transmits an acquisition request to said server, and the data stored in the data filing part of said server is received and stored in said data storage part.

2. The remote control apparatus according to claim 1, wherein said controlled appliance is equipped with an appliance unique data transmission part that transmits appliance unique data, and said server is equipped with an appliance unique data receiving part that receives the appliance unique data and notifies said appliance management part as means for storing appliance unique data in said appliance management part of said server.

3. The remote control apparatus according to claim 1, wherein
   said controlled appliance is equipped with an appliance control part that controls said controlled appliance itself, and an appliance state judgment part that judges the state of said appliance control part, and
   said data acquisition request transmission part judges the state of said appliance using said appliance state judgment part when said notice receiving part has received a notice command, and transmits a data acquisition request after detecting a state in which data acquisition can be carried out.

4. The remote control apparatus according to claim 1, wherein said data filing part is a text data storage part that stores text data, such as character information.

5. The remote control apparatus according to claim 1, wherein said controlled appliance according to claim us equipped with a data display part that receives data from said data receiving part and displays the data.

6. The remote control apparatus according to claim 1, wherein image data and text data being used as a pair are stored as set data in said data filing part, said data receiving part of said controlled appliance receives all the image data and text data being used as set data, and then said data storage part stores said image data and said text data as set data.

7. The remote control apparatus according to claim 1, wherein said controlled appliance is equipped with a data display part that receives data from said data receiving part and displays the data, image data and text data being used as a pair are stored as set data in said data filing part, said data receiving part of said controlled appliance receives all the image data and text data being used as set data, and then said data display part displays said image data and said text data as set data.

8. The remote control apparatus according to claim 1, wherein said server is equipped with a receiving part that receives electronic mail to which image data is attached and an analyzing part that analyzes said received electronic mail to store data in said data filing part.

9. The remote control apparatus according to claim 1, wherein said server is equipped with an inter-server communication part operating as means for communicating with other servers to store data in said data filing part.

10. The remote control apparatus according to claim 1, wherein said controlled appliance is equipped with a notice display part that carries out display showing that a notice indicating that image data is stored in said server is received by said notice receiving part.

11. The remote control apparatus according to claim 1, wherein said controlled appliance is equipped with a notice display part that carries out display showing that a notice indicating that image data is stored in said server is received by said notice receiving part, and an operation part that creates an image data receiving command, wherein
   said data acquisition request transmission part transmits an image data acquisition request based on the image data receiving command of said operation part while the display is carried out on said notice display part.

12. The remote control apparatus according to claim 1, wherein said data storage control part is configured so at to sort and store data in a different folder or a different recording medium depending on the type of received image data.

13. The remote control apparatus according to claim 1, wherein said controlled appliance is equipped with a file management part that is configured so that when set data comprising image data and text data stored as a pair in said data storage part is moved or erased, the image data and text data used as a pair are moved or erased simultaneously.

* * * * *

UNITED STATES PATENT AND TRADEMARK OFFICE
CERTIFICATE OF CORRECTION

PATENT NO. : 7,412,292 B2  
APPLICATION NO. : 10/578156  
DATED : August 12, 2008  
INVENTOR(S) : Koji Hirose It is certified that error appears in the above-identified patent and that said Letters Patent is hereby corrected as shown below:

Column 16, Line 25, Claim 5:
 "claims us" should be --claim 1 is--

Column 17, Line 2, Claim 12:
 "at" should be --as--

Signed and Sealed this

Third Day of February, 2009

JOHN DOLL  
*Acting Director of the United States Patent and Trademark Office*